United States Patent [19]
Parker et al.

[11] Patent Number: 4,661,578
[45] Date of Patent: Apr. 28, 1987

[54] HIGH TEMPERATURE EPOXY RESIN COMPOSITION WITH REDUCED VISCOSITY

[75] Inventors: Theodore L. Parker, Lafayette; Patrick H. Martin, Danville, both of Calif.

[73] Assignee: The Dow Chemical Company, Midland, Mich.

[21] Appl. No.: 801,360

[22] Filed: Nov. 25, 1985

[51] Int. Cl.$^4$ .............................................. C08G 59/40
[52] U.S. Cl. ...................................... 528/98; 528/106
[58] Field of Search .................................. 528/98, 106

[56] References Cited

U.S. PATENT DOCUMENTS

| | | | |
|---|---|---|---|
| 2,965,611 | 12/1960 | Schwarzer | 528/98 |
| 3,787,451 | 1/1974 | Mah | 528/98 |
| 3,789,053 | 1/1974 | Clarke | 528/98 |
| 4,351,932 | 9/1982 | Street et al. | 528/322 |
| 4,377,657 | 3/1983 | Street | 528/508 |
| 4,379,908 | 4/1983 | Brownscombe | 528/106 |
| 4,390,664 | 6/1983 | Kanayama | 528/98 |
| 4,394,496 | 7/1983 | Schrader | 528/98 |
| 4,396,754 | 8/1983 | Brownscombe | 528/89 |
| 4,454,283 | 9/1984 | Street | 528/322 |

Primary Examiner—Veronica P. Hoke

[57] ABSTRACT

A composition of matter comprising either at least about 80 wt. % of a monomeric or oligomeric polyglycidyl ether of tris(hydroxyphenyl)alkanes; or at least about 80 wt. % of an epoxy phenol-formaldehyde or cresol-formaldehyde novolac resin in monomeric or oligometric form, e.g., dimers, trimers, tetramers and some higher oligomers in an amount of as little as 5 up to about 95 wt. %; in combination with from about 0.1 to about 20 wt. % of a divinyl benzene compound of the formula:

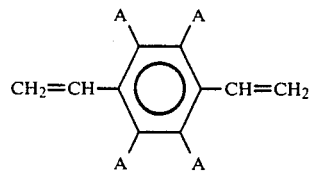

wherein each A independently represents H, F, Cl, Br or $CH_3$ but no more than 2 of A are $CH_3$.

19 Claims, No Drawings

HIGH TEMPERATURE EPOXY RESIN COMPOSITION WITH REDUCED VISCOSITY

TECHNICAL FIELD

The invention relates to epoxy resin compositions which have relatively low viscosity prior to curing and which can be cured to produce cured resins which possess good high temperature properties. The preferred resin compositions are epoxidation products of 1,1,1-tri-(hydroxyphenyl)alkanes in combination with a divinyl benzene compound. Other useful resins are glycidyl ethers prepared from phenol formaldehyde or cresol formaldehyde novolacs in combination with a divinyl benzene compound.

BACKGROUND ART

Monomeric and oligomeric polyglycidyl ethers of substituted or unsubstituted tri(hydroxyphenyl) alkanes form a well defined class of epoxy resins which are known to have good high temperature properties. A thorough description of such resins and a method of synthesizing such resins is found in U.S. Pat. No. 4,394,496, inventor Paul G. Schrader, issued July 19, 1983. The resulting products are known to have outstanding heat distortion temperature and heat resistance when cured. Such is manifested by markedly increased service life at elevated temperatures, as well as other superior properties.

Epoxy novolac resins, including phenol formaldehyde novolac resins and cresol formaldehyde resins, are known to exhibit, in the cured state, reasonably high distortion temperatures and heat resistance although not as outstanding as those properties of the aforementioned polyglycidyl ethers of substituted or unsubstituted tri(hydroxyphenyl) alkanes.

It would be desirable if each of the types of epoxy resins discussed above had somewhat lower viscosity in the uncured state and greater tack without deleterious effect upon their known relatively high heat distortion and heat resistance performances when cured.

DISCLOSURE OF INVENTION

The present invention is directed to overcoming one or more of the problems as set forth above.

The present invention is a composition of matter comprising either at least about 80 wt. % of a monomeric and/or oligomeric epoxidation product of a phenolic compound of the formula

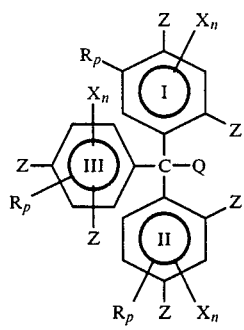

(A)

wherein:
Q is H or an alkyl group of from 1 to about 10 carbon atoms;

each R independently represents an alkyl group of from 1 to about 12 carbon atoms, phenyl or cycloalkyl of from 3 to about 6 carbon atoms;

each Z independently represents H or OH, with the proviso that at least one Z group on each of Rings I, II and III is OH;

each X independently represents bromo, chloro or nitro;

each p independently is 0, 1, or 2, each n independently is 0, 1 or 2, and the sum of n+p for each ring being 0, 1, 2 or 3 when each Z is other than hydrogen, and an epihalohydrin of the formula:

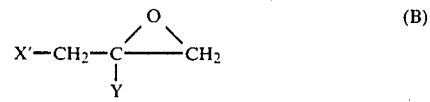

(B)

wherein X' is Cl or Br and Y is H or —CH₃; said epoxidation product having an average epoxide functionality of from about 2.5 to about 6.0, or at least about 70% of theoretical for the number of available hydroxyls, whichever is greater;

or at least about 80 wt. % of an epoxy phenol-formaldehyde or cresol-formaldehyde novolac resin in monomeric or oligometric form, e.g., dimers, trimers, tetramers and some higher oligomers in an amount of as little as 5 up to about 95 wt. %;

in combination with from about 0.1 to about 20 wt. % of a divinyl benzene compound of the formula:

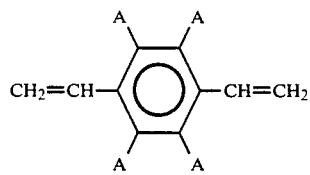

as such or in admixture with isomers thereof and wherein each A independently represents H, F, Cl, Br or CH₃ but no more than 2 of A are CH₃.

BEST MODE FOR CARRYING OUT THE INVENTION

The monomeric and/or oligomeric epoxidation product may be obtained commercially or may be synthesized by any of the methods set forth in U.S. Pat. No. 4,394,496. The novolac resins may be obtained commercially or synthesized by any of the methods set forth in the literature. The structures and properties of phenol formaldehyde novolac resins are set forth, for example, in the publication "D.E.N. Epoxy Novolac Resins", 1972, The Dow Chemical Company. The structures and properties of cresol-formaldehyde novolac resins are set forth, for example, in the publication "Epoxy Resins" by Clayton May and Yoshio Tanaka, Marcell Decker Incorporated, New York, 1973.

The above discussed divinyl benzene compound may be obtained commercially and/or synthesized by any of the several methods set forth in the literature.

The monomeric epoxidation product preferably consists essentially of molecules of the formula (I):

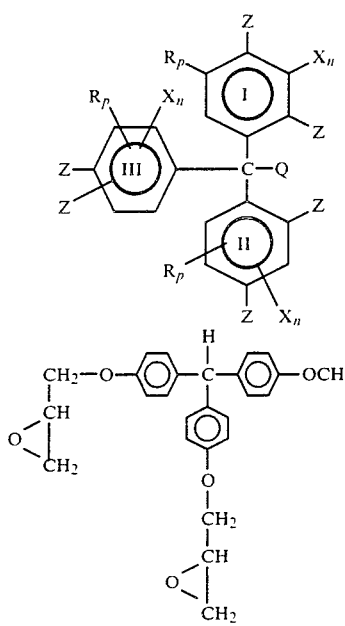

(I)

Other epoxidation products comprising not only the monomeric epoxides but also oligomers, e.g., dimers, trimers, tetramers and some higher oligomers are formed under some conditions, e.g., from as little as 5 up to about 95 wt. %, of the product is formed as oligomers from the monomer via oxirane/—OH adduction during the epoxidation reaction. These oligomers can be exemplified by the leucaurin-derivable products of the following Formula II (wherein, for purposes of illustration only, one Z group per ring and each Q and Y are H, and each n and p are zero):

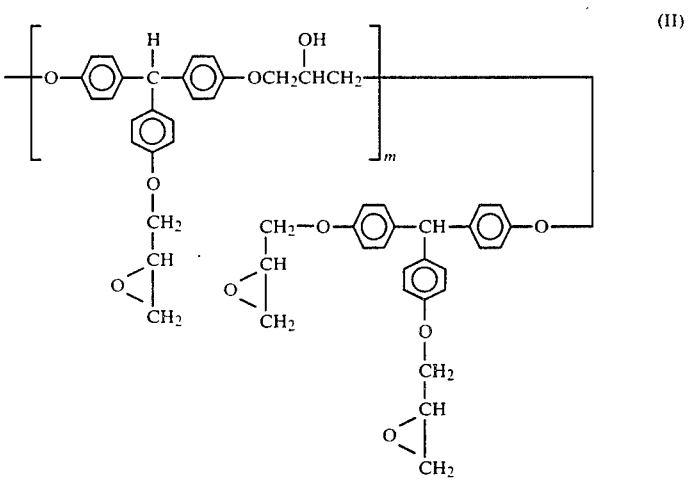

(II)

wherein

Q is H or an alkyl group of from 1 to about 10 carbon atoms;

each R independently represents an alkyl group of from 1 to about 12 carbon atoms, phenyl or cycloalkyl group of from 3 to about 6 carbon atoms; and each Z independently represents H or

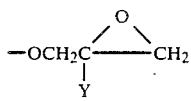

with the proviso that at least one Z on each of Rings I, II and III is

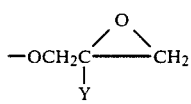

each Y independently represents H or methyl;

each X independently represents bromo, chloro or nitro;

each p independently is 0, 1 or 2, each n independently is 0, 1 or 2, and the sum of n+p for each ring being 0, 1, 2 or 3 when both Z groups are other than hydrogen.

The presently most preferred compositions are those derived from tri(hydroxyphenol)alkanes corresponding to the epoxides of the foregoing formula in which Q is H. Especially preferred are such products derived from 2,4′,4″-trihydroxy(triphenylmethane).

wherein m=0, 1 or 2. The $R_p$, $X_n$, Q, Z and Y groups can be present and have the same meaning as set forth above. Those skilled in the art will recognize that similar oligomers can be formed from other monomeric epoxides of Formula I as well. They will further recognize that small amounts of oligomers in which more than two of the epoxide groups in a single monomeric molecule have been reacted out with hydroxyl groups may be present in the epoxidation product.

The monomeric and/or oligomeric epoxidation product (polyglycidylether) of the preferred embodiment of the invention has an average epoxide functionality of from about 2.5 (where Q is H, and p are zero and each of Rings I, II and III of the representative formula have only one epoxide group) to about 6.0, preferably from about 2.5 to about 5.0, or at least 70% of theoretical for the number of available hydroxyls on the starting triphenolic precursor material, whichever is greater. For the preferred monomeric products, the theoretical epoxide functionality would be 3.0 where one Z group per ring is always H and 6.0 wherein each ring has two available hydroxyls on the phenolic starting material and each are converted to an epoxy group.

Monomeric and/or oligomeric epoxidation compounds are viscous liquids or solids at room temperature, the monomers usually being very fluid at about 50° C., while the oligomers have a softening point of about 80°–95° C. or higher. As evidenced by the average epoxide equivalent weight's (EEW's) and molecular weights of the compounds, they contain only relatively small amounts of by-products.

By inspection of the foregoing formula II it is apparent that the molecular weight of such an oligomer is equal to the sum of the molecular weights of one fully epoxidized polyol molecule and m+1 polyol molecules in which all but one of the hydroxyls has been converted to a glycidyl ether group. That is, $M_O=(M_p-M+NM_G)+(m+1)[M_p-(N-1)+(N-1)M_G]$; $M_O$, $M_p$ and $M_G$ being the moleuclar weights respectively of the oligomer, the polyphenol and a glycidal group of the formula

  (C)

(Y being defined as in Formula B), and N being the number of available hydroxyls in the polyphenol.

It is apparent that the epoxide functionality for such an oligomer may be expressed as $f_F=m(N-2)+2(N-1)$.

$$f_E = \frac{(N-2)(M_O - 2M_p - (2N-1)M_G + 2N - 1)}{M_p + (N-1)(M_G - 1)} + 2(N-1)$$

The actual, average epoxide functionality for a given product—or fraction thereof separated by preparative GPC (Gel Permeation Chromatography)—of course can be taken as the ratio of the average molecular weight to the EEW, both of which can be experimentally determined. However, for the purpose of defining the predominantly oligomeric products of the present invention, relationship (1) may be utilized to estimate the maximum epoxide functionality that such a product of a known average molecular weight may have. (And, of course, the maximum value of m can then also be estimated). If the monomeric epoxides are first largely eliminated (as by GPC), the molecular weight (used as $M_O$) will be more representative of the oligomeric portion of the product and a higher value of $f_E$ will be obtained.

In the broadest definition of the epoxidation compounds which form a portion of the composition of matter of the invention, given earlier herein, reference is made to the product having an average epoxide functionality of from about 2.5 to about 6, or at least about 70% of theoretical for the number of available hydroxyls, whichever is greater. As applied to those products comprising oligomers, the epoxide functionality can exceed 100% of the theoretical value for the monomeric product—but cannot exceed the value of $f_E$ calculated from expression (1).

The polyepoxides thus prepared may be admixed prior to curing with other epoxies to result in a blend with desirable properties. Usually, such other epoxies are employed in amounts of from about 5 to about 95 weight percent. Examples include mono-functional reactive diluents, such as phenyl glycidyl ether, allyl glycidyl ether, butyl glycidyl ether, cyclohexene monoxide, and the like, alkyl ene oxides, such as butylene oxide, propylene oxide, octylene oxide, and the like. Polyfunctional epoxides are also suitable, such as epoxy novolacs, liquid and solid diglycidyl ethers of dihydroxy compounds, butadiene dioxide, 4,4'-isopropylidene diphenol, diglycidyl ether, cyclopentadiene dioxide, vinyl cyclohexene dioxide, bis(2,3-epoxycyclopentyl)ether, diglycidyl phthalate, diglycidyl aniline, tris epoxides from aminophenols and epichlorohydrin, and the like. Mixtures of the above are also suitable. U.S. Pat. No. 2,935,488 (Phillips, et al., 1960), for example, exemplifies mixtures of epoxies suitable herein.

In accordance with the present invention 0.01 to 20 wt. % of a divinyl benzene compound is admixed with the polyepoxides prior to their curing. This leads to a significant reduction in viscosity of the monomers. Once curing has taken place the resultant product has significantly more resistance to heat distortion than do other types of epoxies normally employed for such uses as potting, encapsulation, high performance coatings and foams, castings, tooling, high temperature wire coatings, caulking compounds, fiber-resin composites, laminates, adhesives, molding compounds and the like. While in no way being bound by theory it is believed that the divinyl benzene compound polymerizes during the curing of the epoxy resins to form an interpenetrating network therewith. The high temperature stability of the resulting interpenetrating polyvinyl benzene compound matrix is sufficiently high so that the high temperature properties of the majority epoxy resins are not deleteriously affected. Also, the tack of such products is increased.

The polyepoxides which form a portion of the composition of the matter of the present invention can be cured alone or in combination with other resins, and in combination with the divinyl benzene compound of the present invention, under typical curing conditions with known catalysts, such as polyalkylene amine, aromatic diamines, anhydrides, melamine/formaldehyde resins and the like.

Preferred epoxides used in the present invention include various species corresponding to the above Formula I. In one such preferred embodiment, n and p are zero and each of the Z groups in the para positions on the rings (I, II or III) they are attached to is an

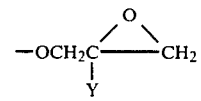

(i.e., leucaurin tris epoxide, when there is only one Z group on each ring) group, all of the other Z groups being hydrogen. In further embodiments, epoxide products wherein n and/or p is zero are preferred. In a further preferred embodiment, one Z group of Ring III is hydrogen. Another preferred class of epoxides are those of Formula I wherein n and p are zero and one Z of Ring III is hydrogen. In another such embodiment, epoxides wherein n is zero, one of the Z groups on Ring III is hydrogen and Q is hydrogen are preferred. In an additional embodiment, epoxide products wherein each Z is

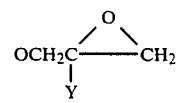

are preferred. In yet another embodiment, epoxide products having an average epoxide functionality of from about 2.8 to about 4.5 are preferred. The most preferred epoxy products used in this invention consist at least predominantly of 2,4',4''tri((2,3-epoxypropoxy)-phenyl)methane or tris(4(2,3-epoxypropoxy)-phenyl)methane, the triglycidyl ether of leucaurin. These products have an epoxy equivalent weight of from about 153 to 170, an average epoxide functionality of about 2.8 to about 3.2 and a viscosity of from about 8500 to about 30,000 cps or more-preferably from about 8500 to about 18,000 cps, at 50° C. (theoretical EEW of the pure tris-epoxide=153.7).

The phenyl rings (Rings I and II) have hydroxy groups in the ortho and/or para positions. The Ring III also can have up to two hydroxy substituents which can be in the ortho, meta or para position(s). Each of Rings I, II and III can be further substituted in available ring positions with R or X groups as defined.

The polyepoxides useful in this invention may be blended with various other epoxides as is discussed above. For instance, they may be admixed with epoxy novolac resins to give a blend with a lower viscosity than that of the epoxy novolac alone, without sacrificing functionality and, consequently, with substantial retention of the physical and chemical properties of the cured epoxides of this invention. Likewise, these polyepoxides can be blended with liquid and solid diglycidyl ethers of dihydroxy compounds to slightly increase the cross-linking density of the cured product. By such blends it is possible to adjust the properties of a resin to those desired, generally higher service temperature in the cured product, without imposing any fabrication difficulties. The flexibility of this concept is exemplified in that the blends can be achieved by mixing the polyepoxides before curing or by blending the phenolic reactants before epoxidation. The possible combinations are innumerable. It has been found that utilizing as little as 5 wt. % of the epoxides of this invention with the above epoxides enhances their high temperature service.

The polyepoxides useful in the invention, as defined in Formulas I and II herein, are generally useful in the same areas as other epoxy resins, as outlined above.

The polyepoxides used in the composition of matter of the present may be cured by typical agents under known conditions. It has been found that the following curing agents are quite suitable: methylene dianiline, m-phenylenediamine, and mixtures thereof; o- and p-phenylenediamines; benzidine; diaminodiphenylsulfone; 2,6-diaminopyridine; benzyldimethylamine; tetramethylethylenediamine; N-methylmorpholine; diethylene triamine; triethylenediamine; tetramethylguanidine; dicyandiamide; dimethylethanolamine; diethanolamine; trialkylamines, such as triethylamine, tripropylamine and tributylamine; 4-picoline; and the like. Also suitable are $BF_3$ complexes, such as $BF_3$ monoethylamine; borates, such as tricresylborate; anhydrides, such as Nadic methyl anhydride, hexahydrophthalic anhydride, dodecenyl succinic anhydride, maleic anhydride, glutaric anhydride, pyromellitic dianhydride, trimellitic anhydride, tetrahydrophthalic anhydride, chlorendic anhydride, polysebacic polyanhydrides, polysulfides, polyazalaic anhydride, phthalic anhydrides, benzophenonetracarboxylic acid dianhydride, cyclopentanetetracarboxylic acid anhydride, and the like.

All of these curing agents can be employed with the epoxide/divinyl benzene compositions of this invention over a wide range of temperatures depending upon the properties desired and the curing agent used. One could use, for instance, 2 hours at 120° for a very moderate cure of the aromatic amines, tertiary amines, $BF_3$ complexes, borates, and the readily soluble or lower melting anhydrides. For optimum properties, which would most likely be desired when the tris(4-hydroxyphenyl)methane epoxide is being used, step-curing is most suitable, such as 16 hours at 85° C. plus 16 hours at 160° C., or 16 hours at 85° C. plus 16 hours at 160° C. plus 4 hours at 230° C. The shortest possible curing times are, of course, desirable and very high heat distortion temperatures (greater than 266° C.) can be achieved by curing 2 hours at 230° C. with such curing agents as methylene dianiline, metaphenylenediamine, benzidine, diaminodiphenylsulfone, $BF_3$ complexes, maleic anhydride-trimellitic anhydride mixtures, maleic anhydride-pyromellitic anhydride mixtures, hexahydrophthalic anhydride-trimellitic or pyro-mellitic anhydride mixtures, phthalic anhydride mixed with trimellitic, or pyromellitic anhydride. Other anhydrides, such as cyclopentanetetracarboxylic acid dianhydride or benzophenetetracarboxylic acid anhydride mixed with maleic, phthalic, or hexahydrophthalic anhydrides, can also be used. Or, the high melting anhydrides can be used alone if they are milled into the resin to achieve complete dispersion.

Because of the outstanding heat distortion temperature and heat resistance of the cured epoxides of this invention, as manifested by a markedly increased service life at elevated temperatures, as well as other superior properties, these epoxides are suitable for use in many specialized fields of application. Because of the relatively low viscosity of the monomers from which the cured epoxides of this invention are made the monomers can readily be flowed into convoluted shapes, cracks and crevices. Yet, after curing, the resulting products retain the aforementioned outstanding heat distortion temperature and heat resistance.

In the area of fiberglass reinforced epoxies, they find application in high temperature ablative heat shields and nose cones as well as rocket motor cases and thrust chambers. Other uses are in laminates requiring high hot strength such as printed circuit boards. Since the cured products have outstanding chemical and solvent resistance, they can be used in epoxy-fiberglass pipe which will also have higher hot strengths than possible before. This is also true of pressure spheres and tanks requiring chemical, solvent and/or heat resistance. Hoods, stacks, and support member of epoxy/glass requiring greater acid, caustic or solvent resistance are other possibilities.

The polyepoxides may also be used in structural composites with carbon fiber, boron fiber, boron fiber or glass fiber for aircraft for which more heat resistant components are now required.

In the electrical field these compositions, with proper curing agents, give cured formulations with higher heat resistance and hot strength than available before, low dielectric constants, high resistivity, low electrical loss and superior arcing and tracking resistance.

Coatings based on or utilizing these new epoxides achieve greater chemical, heat or solvent resistance. This is true for non-solvent coatings as well as for coatings based on fatty acid esters such as tung, dehydrated castor or linseed.

These epoxides are also an excellent base for the more recently developed epoxy acrylate or other highly chemical vinyl ester resins.

High temperature adhesives is an area in which the compounds of this invention are especially useful.

The following examples are for purposes of illustration and are not to be construed as limiting the present invention in a manner inconsistent with the claims appended to this specification.

EXAMPLE 1

Divinyl Benzene-Viscosity-Heat Distortion Temperature Relationship

The relationship was determined between the level of divinyl benzene in the composition, the melt viscosity at 100° C. and the heat distortion temperature (HDT) of the composition when cured with diaminodiphenylsulfone (DADS) utilizing a cure schedule of two hours at 100° C., followed by 18-hours at 180° C., followed by two hours at 200° C. The divinyl benzene utilized was commercially available Dow DVB-HP (a trademark of The Dow Chemical Company). This composition contained approximately 78% divinyl benzene with the remainder being primarily vinylethyl benzene and diethyl benzene.

The divinyl benzene was added to a tris epoxy resin Tactix 742 (a trademark of The Dow Chemical Company, principally the tris glycidyl ether of tri(hydroxyphenyl)methane, about 60% to 85% the monomer and the remainder oligomers based upon the monomer) which was preheated to 40° C. to 45° C. to liquefy it. Addition was drop wise and the solution was agitated to produce a uniform composition. The amount of divinyl benzene utilized was selected to provide a desired divinyl benzene level in the eventual cured resin. Addition of the divinyl benzene to the tris epoxy resin provided a light amber color clear composition which was semi-solid to liquid in ambient temperature depending on the divinyl benzene level.

Table 1 shows the relationships between the levels of divinyl benzene in the composition, the melt viscosity at 100° C., and the heat distortion termperature of the composition when cured as set forth above.

TABLE 1

| Divinyl Benzene Level, % | Viscosity @ 100° C., Centipoise | HDT Cured Resin, °C. |
|---|---|---|
| 0 | 1549 | 256 |
| 1 | 902 | 256 |
| 2 | 650 | 242 |
| 5 | 336 | 261 |
| 10 | 154 | * |
| 15 | 69 | * |
| 20 | 35 | * |

*Cured resin bubbled and was unsuitable for HDT analysis.

The data illustrates the significant reduction in viscosity attainable with even very low levels of divinyl benzene. Table 1 further illustrates that the high temperature properties of the resin, as illustrated by its heat distortion temperature, is not seriously effected at levels of divinyl benzene (78%) of up to at least 5%. The HDT values were determined by TMA (thermal mechanical analysis—DuPont Instruments).

EXAMPLE 2

Relationships Between Level of Divinyl Benzene, Melt Viscosity and Glass Transition Temperature Utilizing 95% Divinyl Benzene Additive Divinyl benzene-tris epoxy resin compositions were formulated having 1%, 2%, 5%, 10% and 20% of 95% divinyl benzene (remainder principally vinylethyl benzene and diethyl benzene) by the method set forth in Example 1. Melt viscosity was determined at 100° C. The glass transition temperature was determined by dynamic mechanical analysis. The glass transition temperature is a measure of the thermal stability of the polymer and is generally within 5° to 10° C. of the heat distortion temperature. Table 2 reports the result of the testing.

TABLE 2

| Divinyl Benzene Level, % | Viscosity @ 100° C., Centipoise | Glass Transition Temperature, °C. |
|---|---|---|
| 0 | 1549 | 256 |
| 1 | 945 | 260 |
| 2 | 748 | — |
| 5 | 428 | 218 |
| 10 | 255 | 180 |
| 20 | 63 | * |

*Cured resin bubbled and was unsuitable for analysis.

This example demonstrates the usefulness of 95% divinyl benzene in reducing the viscosity of epoxy resins without serious effect upon glass transition temperature up at least 10% divinyl benzene (95%) admixture with the epoxy resin.

While the monomeric tris (etc) epoxides are the preferred products of the present invention for uses requiring the highest Heat Distortion Temperatures, epoxidation products of higher molecular weights which consist predominantly of the oligomers are also highly useful. The oligomeric products possess similar high heat distortion properties and have the added advantage of being obtainable in solid form, rather than the generally semi-solid or viscous liquid forms of the monomeric epoxidation products.

Industrial Applicability

The composition of the matter of the present invention is a useful epoxy resin composition which is curable to form an oligomeric product which has high to outstanding Heat Distortion Temperatures and yet which has relatively low viscosity prior to curing.

We claim:
1. A composition of matter, comprising:
either at least about 80% of
the monomeric or oligomeric epoxidation product of a phenolic compound of the formula

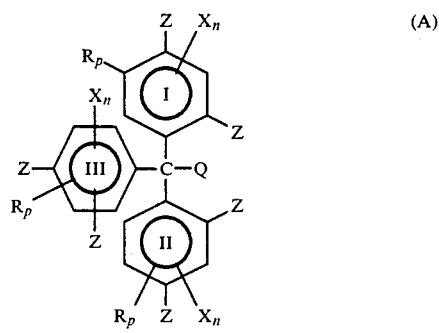

(A)

wherein:
Q is H or an alkyl group of from 1 to about 10 carbon atoms;
each R independently represents an alkyl group of from 1 to about 12 carbon atoms, phenyl or cycloalkyl of from 3 to about 6 carbon atoms;
each Z independently represents H or OH, with the proviso that at least one Z group on each of Rings I, II and III is OH;
each X independently represents bromo, chloro or nitro;

each p independently is 0, 1 or 2, each n independently is 0, 1 or 2, the sum of n+p for each ring being 0, 1, 2 or 3 when each Z is other than hydrogen;

and an epihalohydrin of the formula:

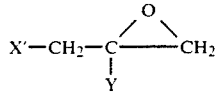
(B)

wherein
X' is Cl or Br and Y is H or —CH₃;
said epoxidation product having an average epoxide functionality of from about 2.5 to about 6.0, or at least about 70% of theoretical for the number of available hydroxyls, whichever is greater; or
at least about 80% of an epoxy phenol-formaldehyde or cresol-formaldehyde novolac resin in monomeric or oligomeric form;
in admixture with:
from about 0.1% to about 20% of a divinyl benzene compound of the formula

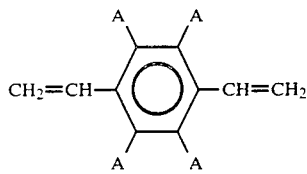

as such or in admixture with isomers thereof and wherein each A independently represents H, F, Cl, Br or CH₃ but no more than 2 of A are CH₃.

2. A composition of matter as set forth in claim 1, wherein in the phenolic compound, each n is zero.

3. A composition of matter as set forth in claim 1, wherein in the phenolic compound, each p is zero.

4. A composition of matter as set forth in claim 1, wherein in the phenolic compound, each n and each p is zero.

5. A composition of matter as set forth in claim 1, wherein in the phenolic compound, one Z on Ring III is H.

6. A composition of matter as set forth in claim 1, wherein in the phenolic compound one Z is H on each of Rings I, II and III.

7. A composition of matter as set forth in claim 1, wherein in the phenolic compound, Q is H.

8. A composition of matter as set forth in claim 2, wherein in the phenolic compound, Q is H.

9. A composition of matter as set forth in claim 3, wherein in the phenolic compound, Q is H.

10. A composition of matter as set forth in claim 4, wherein in the phenolic compound, Q is H.

11. A composition of matter as set forth in claim 5, wherein in the phenolic compound, Q is H.

12. A composition of matter as set forth in claim 6, wherein in the phenolic compound, Q is H.

13. A composition of matter as set forth in claim 6, wherein said phenolic compound is tris-(4-hydroxyphenyl)methane.

14. A composition of matter as set forth in claim 6, wherein said phenolic compound is 2,4',4''-trihydroxytriphenylmethane.

15. A composition of matter as set forth in claim 6, in which said epoxidation product is tris-(4-glycidyloxyphenyl)-methane.

16. A composition of matter as set forth in claim 6, in which said epoxidation product is 2,4',4''-tri(-glycidyloxy)-triphenylmethane.

17. A cured composition of matter as set forth in claim 1.

18. A composition of matter as set forth claim 1, wherein, in the divinyl benzene compound, each A is hydrogen.

19. A composition of matter, comprising:
at least about 80% of
the monomeric or oligomeric epoxidation product of a phenolic compound of the formula

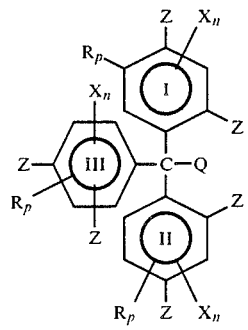
(A)

wherein:
Q is H or an alkyl group of from 1 to about 10 carbon atoms;
each R independently represents an alkyl group of from 1 to about 12 carbon atoms, phenyl or cycloalkyl of from 3 to about 6 carbon atoms;
each Z independently represents H or OH, with the proviso that at least one Z group on each of Rings I, II and III is OH;
each X independently represents bromo, chloro or nitro;
each p independently is 0, 1 or 2, each n independently is 0, 1 or 2, the sum of n+p for each ring being 0, 1, 2 or 3 when each Z is other than hydrogen;
and an epihalohydrin of the formula:

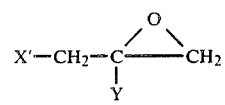
(B)

wherein
X' is Cl or Br and Y is H or —CH₃;
said epoxidation product having an average epoxide functionality of from about 2.5 to about 6.0, or at least about 70% of theoretical for the number of available hydroxyls, whichever is greater;
at least about 80% of an epoxy phenol-formaldehyde or cresol-formaldehyde novolac resin in monomeric or oligomeric form;
in admixture with:
from about 0.1% to about 20% of a divinyl benzene compound of the formula:

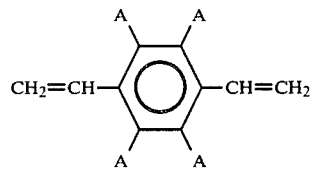

as such or in admixture with isomers thereof and wherein each A independently represents H, F, Cl, Br or CH₃ but no more than 2 of A are CH₃.

* * * * *

UNITED STATES PATENT AND TRADEMARK OFFICE
CERTIFICATE OF CORRECTION

PATENT NO. : 4,661,578

DATED : April 28, 1987

INVENTOR(S) : Theodore L. Parker; Patrick H. Martin

It is certified that error appears in the above-identified patent and that said Letters Patent is hereby corrected as shown below:

Col. 2, line 57, an asterisk should be inserted after "D.E.N.";

Col. 5, line 4, "molecular" has been misspelled;

Col. 5, line 55, "alkylene" has been misspelled;

Col. 6, lines 33-38, the formula should read:

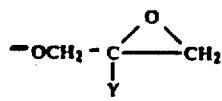

Signed and Sealed this

Eighth Day of November, 1988

Attest:

DONALD J. QUIGG

Attesting Officer

Commissioner of Patents and Trademarks